United States Patent
Kirkley et al.

(10) Patent No.: US 10,457,398 B2
(45) Date of Patent: *Oct. 29, 2019

(54) COLLAPSIBLE BACKREST

(71) Applicant: AMI Industries, Inc., Colorado Springs, CO (US)

(72) Inventors: Jacob W. Kirkley, Colorado Springs, CO (US); Chad R. Pacheco, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,305

(22) Filed: Mar. 26, 2019

(65) Prior Publication Data

US 2019/0217958 A1  Jul. 18, 2019

Related U.S. Application Data

(62) Division of application No. 15/382,239, filed on Dec. 16, 2016, now Pat. No. 10,329,021.

(51) Int. Cl.
*A47C 13/00* (2006.01)
*B64D 11/06* (2006.01)

(52) U.S. Cl.
CPC ........ *B64D 11/0698* (2014.12); *B64D 11/064* (2014.12); *B64D 11/0647* (2014.12); *B64D 11/0649* (2014.12); *B64D 11/0691* (2014.12)

(58) Field of Classification Search
CPC ............ B64D 11/0698; B64D 11/0649; B64D 11/0647; B64D 11/0691; B60N 2/0284; B60N 2/20; B60N 2/203; B60R 7/043
(Continued)

(56) References Cited

U.S. PATENT DOCUMENTS

| 2,279,748 | A | ‡ | 4/1942 | Deak | A47C 1/143 |
| | | | | | 297/19 |
| 2,497,412 | A | * | 2/1950 | Larin | A47C 9/06 |
| | | | | | 114/188 |

(Continued)

OTHER PUBLICATIONS

USPTO, Restriction/Election Requirement dated Aug. 1, 2018 in U.S. Appl. No. 15/382,239.

(Continued)

*Primary Examiner* — Chi Q Nguyen
(74) *Attorney, Agent, or Firm* — Snell & Wilmer L.L.P.

(57) ABSTRACT

A collapsible backrest may include a cover and a back panel retained within a first compartment of the cover. A base panel flexibly coupled to the back panel and retained within a second compartment of the cover with the central panel and the base panel defining a notch. A central panel may be flexibly coupled to the base panel and retained within a third compartment of the cover. An end panel may also be flexibly coupled to the central panel and retained within a fourth compartment of the cover. The central panel and the end panel define a cavity. The base panel, the central panel, and the end panel form a triangular support structure in a deployed position. The base panel, the central panel, and the end panel may also be arranged end-to-end and substantially parallel to the back panel in a stowed position.

10 Claims, 7 Drawing Sheets

(58) Field of Classification Search
USPC .......... 297/105, 283.3, 111, 114, 118, 112, 297/188.11, 230.14, 236, 92, 94, 93, 297/230.13
See application file for complete search history.

(56) References Cited

U.S. PATENT DOCUMENTS

| | | | | |
|---|---|---|---|---|
| 3,594,037 | A ‡ | 7/1971 | Sherman | A47C 1/036 297/14 |
| 4,799,632 | A ‡ | 1/1989 | Baymak | B64D 11/0691 244/122 R |
| 4,902,069 | A ‡ | 2/1990 | Lehnert | B64D 11/0691 297/14 |
| 4,913,487 | A ‡ | 4/1990 | Breckel | A47C 9/06 297/14 |
| 6,996,322 | B2 * | 2/2006 | Bennett | G02B 6/02214 385/135 |
| 7,445,288 | B2 ‡ | 11/2008 | Zapf | B60N 2/20 297/23 |
| 8,056,978 | B2 ‡ | 11/2011 | Shivers | B60N 2/0284 297/10 |
| 8,087,612 | B2 * | 1/2012 | Park | B60N 2/015 244/118.5 |
| 9,004,508 | B2 * | 4/2015 | Tsukada | A61G 7/00 280/47.4 |
| 9,248,066 | B2 * | 2/2016 | Tsukada | A61G 5/08 |
| 9,340,293 | B2 ‡ | 5/2016 | Guering | B64D 11/06 |
| 9,394,054 | B2 ‡ | 7/2016 | Johnson | B64D 11/06 |
| 9,446,849 | B1 * | 9/2016 | Pinkal | B64D 11/064 |
| 9,517,172 | B2 * | 12/2016 | Kume | A47C 20/08 |
| 9,856,024 | B2 * | 1/2018 | Burd | B64D 11/06 |
| 10,065,711 | B2 ‡ | 9/2018 | Fuller, IV | B63B 29/04 |
| 2010/0201172 | A1 * | 8/2010 | Hudswell | B64D 11/06 297/340 |
| 2012/0153687 | A1 ‡ | 6/2012 | Kume | A61G 5/1067 297/118 |
| 2013/0126671 | A1 ‡ | 5/2013 | Guering | B64D 11/06 244/118.6 |
| 2014/0191541 | A1 ‡ | 7/2014 | Ohta | A61G 5/04 297/118 |
| 2014/0319275 | A1 ‡ | 10/2014 | Najd | B64D 11/02 244/118.6 |
| 2014/0368012 | A1 ‡ | 12/2014 | Burd | B64D 11/06 297/33 |

OTHER PUBLICATIONS

USPTO, Non-Final Office Action dated Oct. 11, 2018 in U.S. Appl. No. 15/382,239.

USPTO, Notice of Allowance dated Mar. 5, 2019 in U.S. Appl. No. 15/382,239.

\* cited by examiner
‡ imported from a related application

COLLAPSIBLE BACKREST

CROSS-REFERENCE TO RELATED APPLICATIONS

This application is a divisional of, claims priority to and the benefit of, U.S. Ser. No. 15/382,239 filed Dec. 16, 2016 entitled "COLLAPSIBLE BACKREST," which is incorporated herein by reference in its entirety for all purposes.

FIELD

The disclosure relates generally to stowable seating devices.

BACKGROUND

Aircraft cabin seats are used for flight attendant safety and comfort during taxi, takeoff, landing, and inflight rest periods. Useable volumetric space on an aircraft may be limited for large, bulky seats. Additionally, seats should not hinder ingress and egress for passengers in the event of an emergency. Aircraft cabin seats may be used for long periods of time and longer duration flights. An uncomfortable cabin seat may cause pain and/or discomfort for the crew on an aircraft.

Backrests on many cabin seats as well as other fixed seats are near vertical in some instances. However, seats with more pitched backs tend to be more comfortable for longer durations. Seats built into aircraft and other structures may not have space for a replacement seat with reclining capabilities. Reclining seats may also add weight in aircraft installations to accommodate the moving parts.

SUMMARY

A collapsible backrest is provided. The collapsible backrest comprises a back panel, a base panel flexibly coupled to the back panel, a central panel flexibly coupled to the base panel, and an end panel flexibly coupled to the central panel. The base panel, the central panel, and the end panel form a triangular support structure in a deployed position.

In various embodiments, the back panel, the base panel, the central panel, and the end panel may be contiguous. A cover may be placed over the back panel, the base panel, the central panel, and the end panel. The cover may define a first compartment for the back panel, a second compartment for the base panel, a third compartment for the central panel, and a fourth compartment for the end panel. The cover may also comprise a textile or animal hide stitched between the first compartment and the second compartment. The central panel and the base panel may define a notch. The central panel and the end panel may define a cavity. The back panel may comprise carbon fiber. The base panel may comprise polycarbonate and/or thermoplastic. The base panel may also define cutouts.

A collapsible backrest may also include a cover and a back panel retained within a first compartment of the cover. A base panel may be flexibly coupled to the back panel and retained within a second compartment of the cover. A central panel may be flexibly coupled to the base panel and retained within a third compartment of the cover. An end panel may be flexibly coupled to the central panel and retained within a fourth compartment of the cover. The base panel, the central panel, and the end panel may form a triangular support structure in a deployed position.

In various embodiments, the back panel, the base panel, the central panel, and the end panel may be contiguous. The cover may include at least one of a textile or animal hide stitched to define the first compartment, the second compartment, the third compartment, and the fourth compartment. The first compartment, the second compartment, the third compartment, and the fourth compartment may be stitched together. The central panel and the base panel may define a notch. The central panel and the end panel may define a cavity. The back panel may comprise carbon fiber. The base panel may comprise polycarbonate and/or thermoplastic. The base panel may also define cutouts.

A collapsible backrest may also comprise a cover and a back panel retained within a first compartment of the cover. A base panel flexibly coupled to the back panel and retained within a second compartment of the cover with the central panel and the base panel defining a notch. A central panel may be flexibly coupled to the base panel and retained within a third compartment of the cover. An end panel may also be flexibly coupled to the central panel and retained within a fourth compartment of the cover. The central panel and the end panel define a cavity. The base panel, the central panel, and the end panel form a triangular support structure in a deployed position. The base panel, the central panel, and the end panel may also be arranged end-to-end and substantially parallel to the back panel in a stowed position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to a collapsible backrest for use in conjunction with a seat. The collapsible backrest may sit on a base of the seat and lean against the back of the seat to alter the seating angle. Compliant materials integrated into the collapsible backrest tend to enhance seating comfort. The seating angle may be adaptable based on the dimensions of the collapsible backrest.

Figure 1:
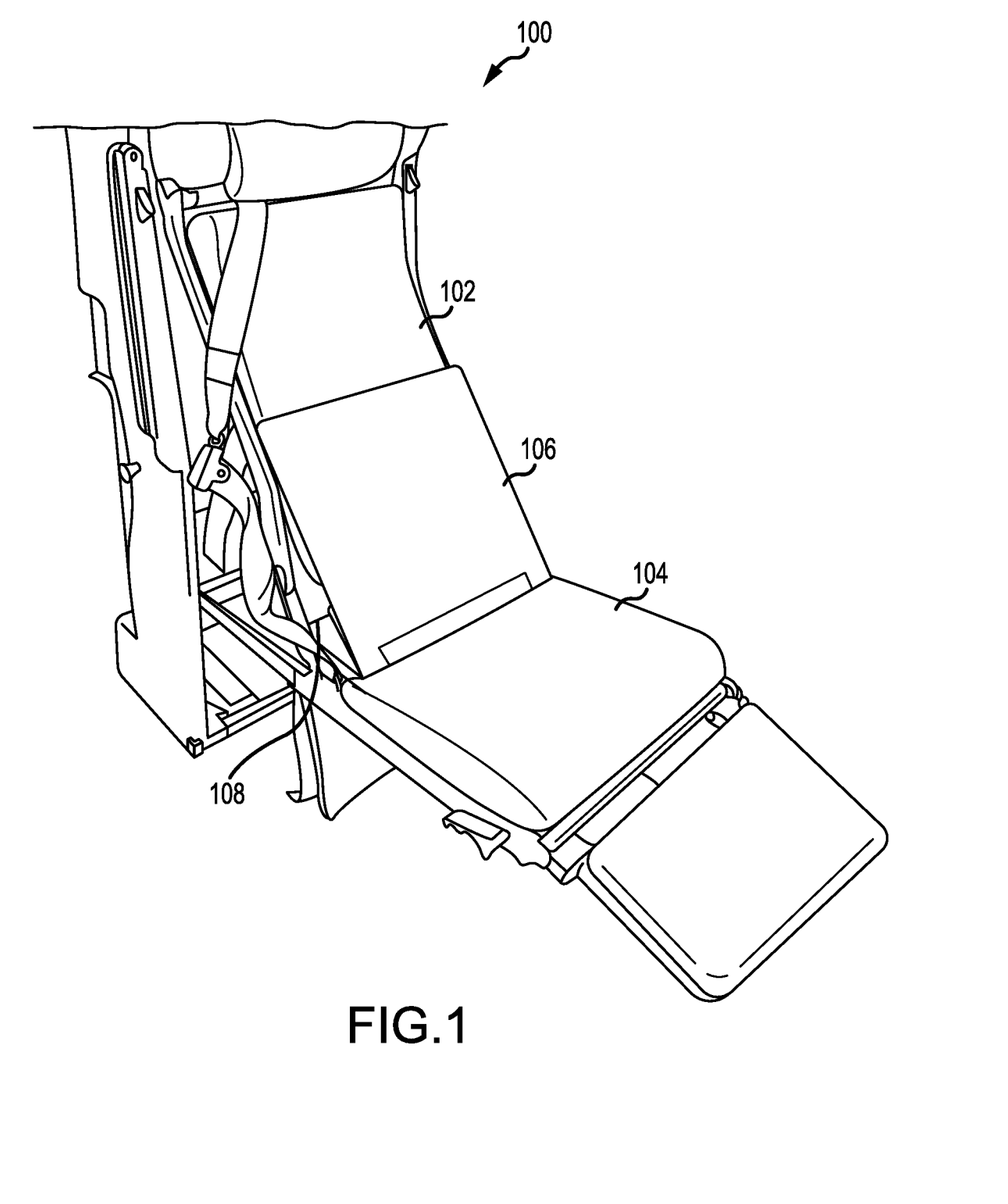
FIG. 1 illustrates an example of a seat having a collapsible backrest in a deployed position, in accordance with various embodiments.

Referring now to FIG. 1, a seat 100 having a collapsible backrest 106 deployed on the seat is shown, in accordance with various embodiments. The seat may comprise a base 104 and a back 102. The back 102 may meet the base 104 along joint 108. Back 102 may not be in contact with base 104 such that joint 108 defines a gap between the back 102 and base 104. Back 102 may also be in contact with base 104 such that joint 108 is defined by the contacting portions of base 104 and back 102.

In various embodiments, back 102 may be pitched at an angle measurable relative to vertical. The angle of incline of back 102 may be adjustable up to a maximum angle of incline. For example, back may have a maximum angle of incline of 40° relative to vertical. Collapsible backrest 106 may be deployed and positioned on seat 100 to increase the maximum angle of incline of the back. Continuing the above example, collapsible backrest 106 may have dimensions suitable to increase the angle of back 102 by 5°, to 45° total. Collapsible backrest 106 may be configured to increase the angle of back 102 by any desired angle such as, for example, 5°, 10°, 15°, 20°, or any other suitable angle. Collapsible backrest 106 may engage seat 100 at joint 108 to restrict lateral movement.

Figure 2:
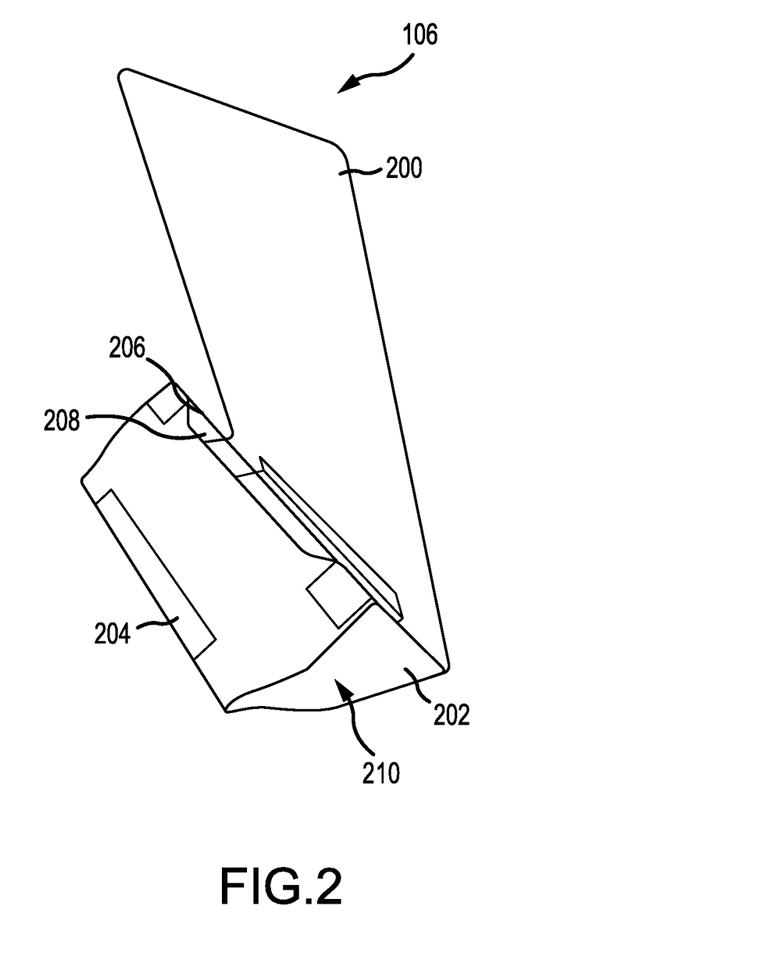
FIG. 2 illustrates a collapsible backrest in a deployed position, in accordance with various embodiments.

Referring now to FIG. 2, collapsible backrest 106 is shown in a deployed configuration, according to various embodiments. Collapsible backrest 106 may comprise four panels flexibly coupled together. The four panels have generally rectangular geometry, but may vary from rectangular as described and depicted herein.

In various embodiments, back panel 200 forms the seating surface in response to collapsible backrest being deployed on a seat. Base panel 202 may be flexibly coupled to back panel 200 along an edge of base panel 202. Base panel 202 rests against a base of a seat (e.g., seat 100 in FIG. 1) in response to collapsible backrest being deployed on the seat. Base panel 202 may also be flexibly coupled to a central panel 204 along a second edge of base panel 202.

In various embodiments, central panel 204 may be flexibly coupled to end panel 206 at a side of central panel 204 opposite base panel 202. Central panel 204 and end panel 206 may define cavity 208. Cavity 208 may enable flexion of back panel 200 into the volume of cavity 208, thereby allowing the back panel 200 to curve to conform to a body for added comfort. The distance back panel 200 can flex may be selected based on the dimensions of cavity 208. End panel 206 may extend from the flexible joint with central panel 204 towards the flexible joint between back panel 200 and base panel 202, where the free terminus of end panel 206 rests in the deployed position.

In various embodiments, base panel 202, central panel 204, and end panel 206 may have a triangular geometry in the deployed position. Back panel 200 may rest substantially parallel to end panel 206 and extend beyond end panel 206. End panel 206, central panel 204, and base panel 202 may form a triangular support structure 210 in the deployed position. The free end of back panel 200, also referred to herein as the distal end of back panel 200, may rest against back 102, contact back 102, or terminate near back 102 of seat 100 in the deployed position. In response to a load applied at the surface of back panel 200, the distal and may be pressed against back 102.

Figure 3:
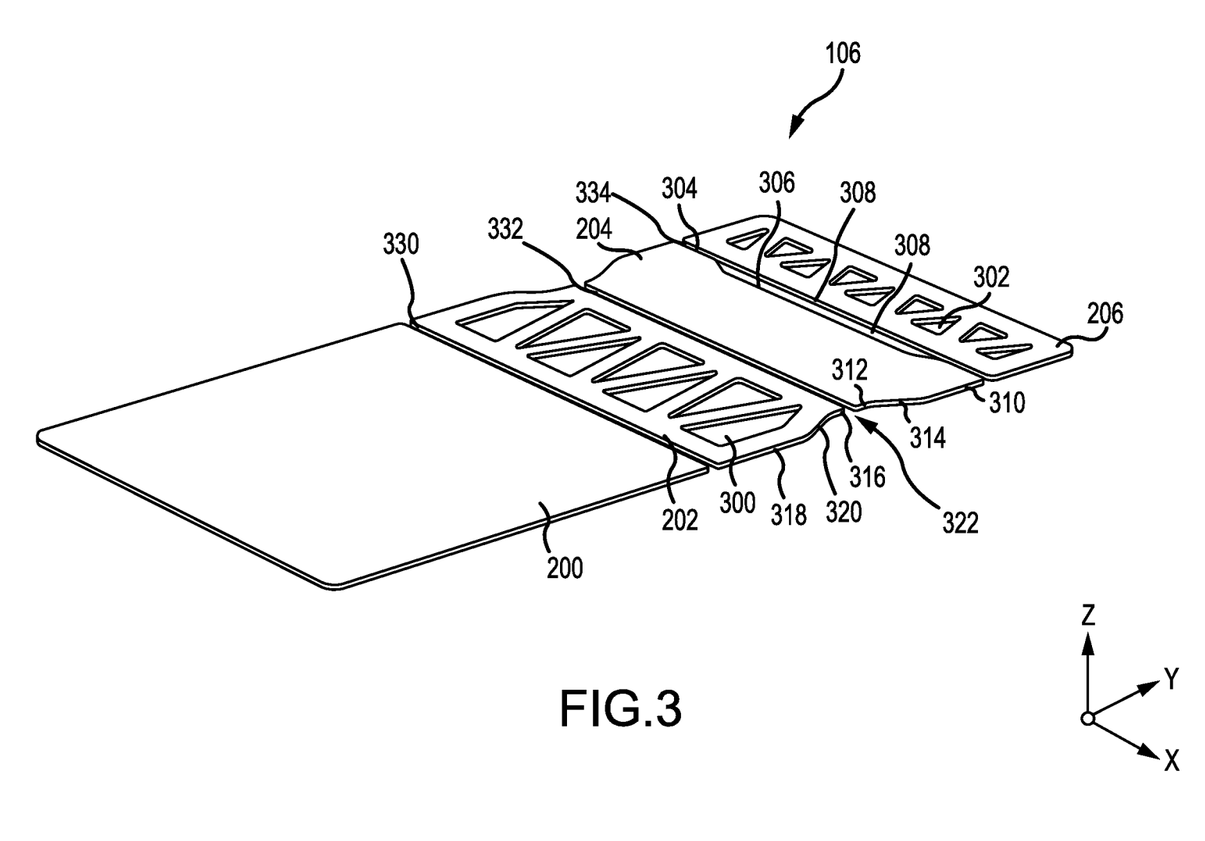
FIG. 3 illustrates a collapsible backrest in an unfolded position, in accordance with various embodiments.

Referring now to FIG. 3, collapsible backrest 106 is shown in an unfolded configuration, according to various embodiments. Back panel 200, base panel 202, central panel 204, and end panel 206 may be contiguous in the y direction. Back panel 200 may be elongated in the y direction relative to the other panels and may thus have the greatest length of the four panels in the y direction. Base panel 202, central panel 204, and end panel 206 may have lengths in the y direction selected to form a triangular support structure with the desired angles and support lengths. The length of end panel 206 may be selected to determine the location of the meeting point between back panel 200 and the flexible joint 324 between end panel 206 and central panel 204 in the deployed position (of FIG. 1).

Back panel 200, base panel 202, central panel 204, and end panel 206 may be made of lightweight and flexible materials such as plastic, thermoplastic, polycarbonate, carbon fiber composite, other fiber composites, thin metal sheets, or other materials suitable to provide back support. In various embodiments, back panel 200 and central panel 204 are made from flexible carbon fiber material and base panel 202 and end panel 206 are formed from polycarbonate. Back panel 200 may be coupled to base panel 202 along flexible joint 330. Flexible joint 330, flexible joint 332, and flexible joint 334 may be made by tape, textile, animal hide, stitched panels, or other flexible material as illustrated in greater detail in FIG. 4.

In various embodiments, the geometries of the various panels of collapsible backrest 106 vary. Back panel 200 may be rectangular and elongated in the y direction. Base panel 202 may define cutouts 300 that yield weight savings. Base panel 202 and central panel 204 may define a notch 322 in the edge of collapsible backrest 106 extending in they direction. Notch 322 may be formed to engage a seat in response to collapsible backrest 106 being deployed on the seat to retain collapsible backrest 106 in the seat.

In various embodiments, base panel 202 may include edge 318, tapered edge 320, and recessed edge 316 defining a portion of notch 322. The width of base panel 202 in the x direction may be greatest at edge 318, may taper along tapered edge 320, and may be least at recessed edge 316. Base panel 202 may include mirrored edges along the opposite edge of base panel 202 to at least partially define a notch on the opposite side of collapsible backrest 106 at the same position in the y direction.

In various embodiments, central panel 204 may include edge 310, tapered edge 314, and recessed edge 312 defining another portion of notch 322. The width of central panel 204 in the x direction may be greatest at edge 310, may taper along tapered edge 314, and may be least at recessed edge 312. Central panel 204 may include mirrored edges along the opposite edge of central panel 204 to at least partially define a notch on the opposite side of collapsible backrest 106 at the same position in the y direction.

In various embodiments, edge 304 of central panel may be flexibly coupled to edge 308 of end panel 206. Edge 304 of central panel 204, recessed edge 306 of central panel 204, and edge 308 of end panel 206 may define cavity 208. End panel 206 may also include cutouts 302 similar to cutouts 300 of base panel 202. Although cutouts are depicted on base panel 202 and end panel 206, any panel of collapsible backrest 106 may include cutouts or may be continuous in the x-y plane.

Figure 4:
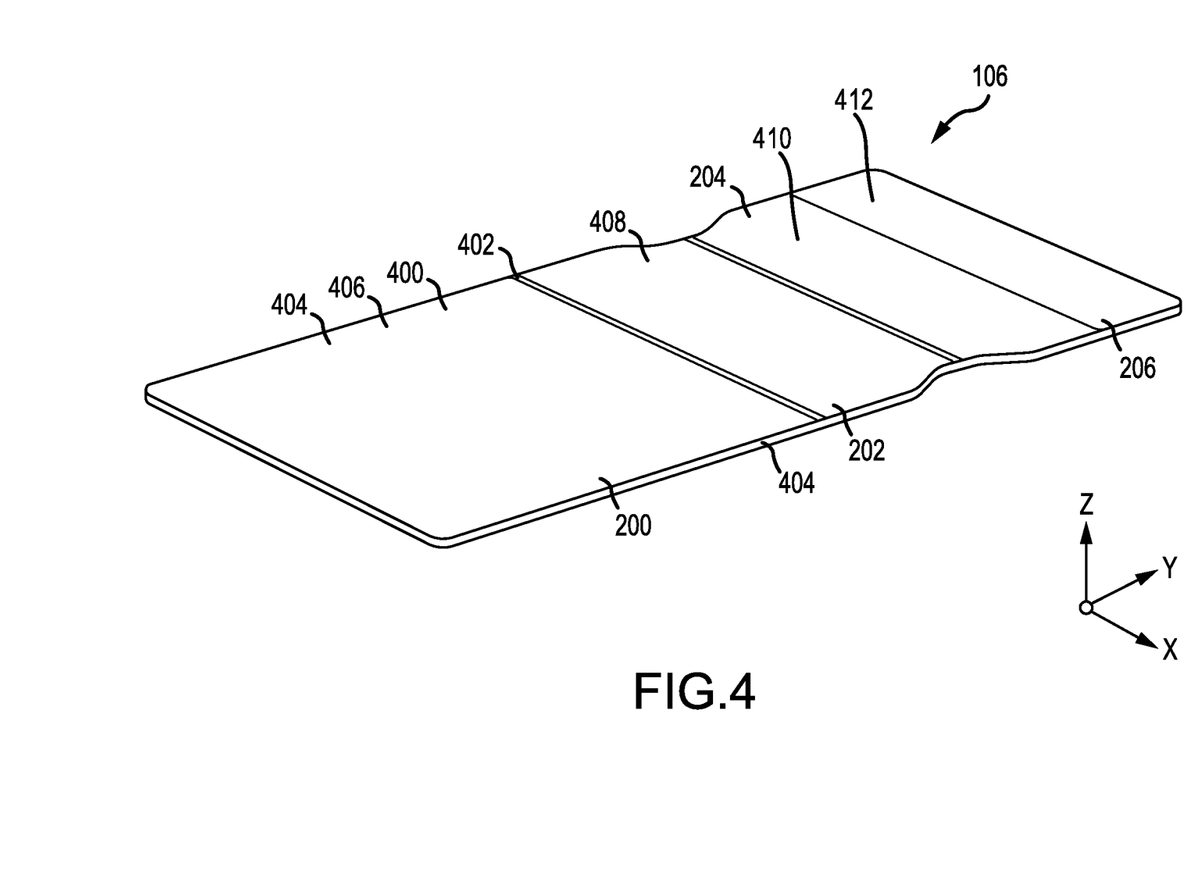
FIG. 4 illustrates a collapsible backrest having a cover, according to various embodiments.

Referring now to FIG. 4, collapsible backrest 106 is shown with a cover 400 to flexibly join back panel 200, base panel 202, central panel 204, and/or end panel 206. Cover 400 may be made of tape, textile, animal hide, or other suitable cover material. Cover 400 may comprise a single piece of material stitched clothes with edge stitching 404 about the outer perimeter of cover 400 and internal stitching defining internal compartments. Cover 400 may also comprise a plurality of compartments stitched together by internal stitching 402. Internal stitching 402 may extend across cover 400 in the y direction to define compartment 406 for back panel 200, compartment 408 for base panel 202, compartment 410 for central panel 204, and/or compartment 412 for end panel 206.

Figure 5:
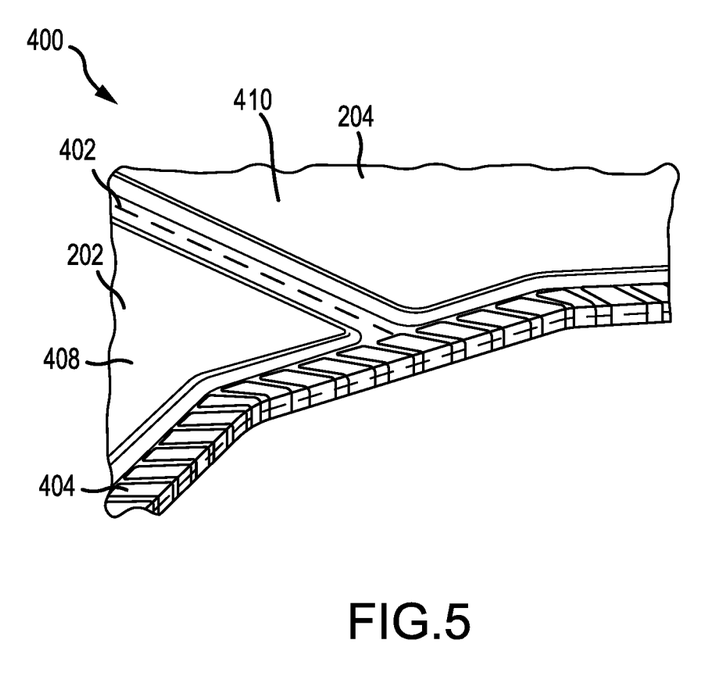
FIG. 5 illustrates detail of a cover for a collapsible backrest, in accordance with various embodiments.

Referring to FIG. 5, detail of cover 400 is shown according to various embodiments. Cover 400 may include edge stitching 404 along the outer edges of compartment 408 and compartment 410. Internal stitching may extend across cover 400 and define the boundary between compartment 408 and compartment 410. Internal stitching may bind compartment 408 and compartment 410 together. Internal stitching may also define compartment 408 and compartment 410 as separate compartments of a continuous piece of material. Internal stitching 402 and/or the boundaries of compartment 408 and compartment 410 may retain base panel 202 and central panel 204 in flexible coupling. The panels may be obstructed from sliding into other compartments.

Figure 6:
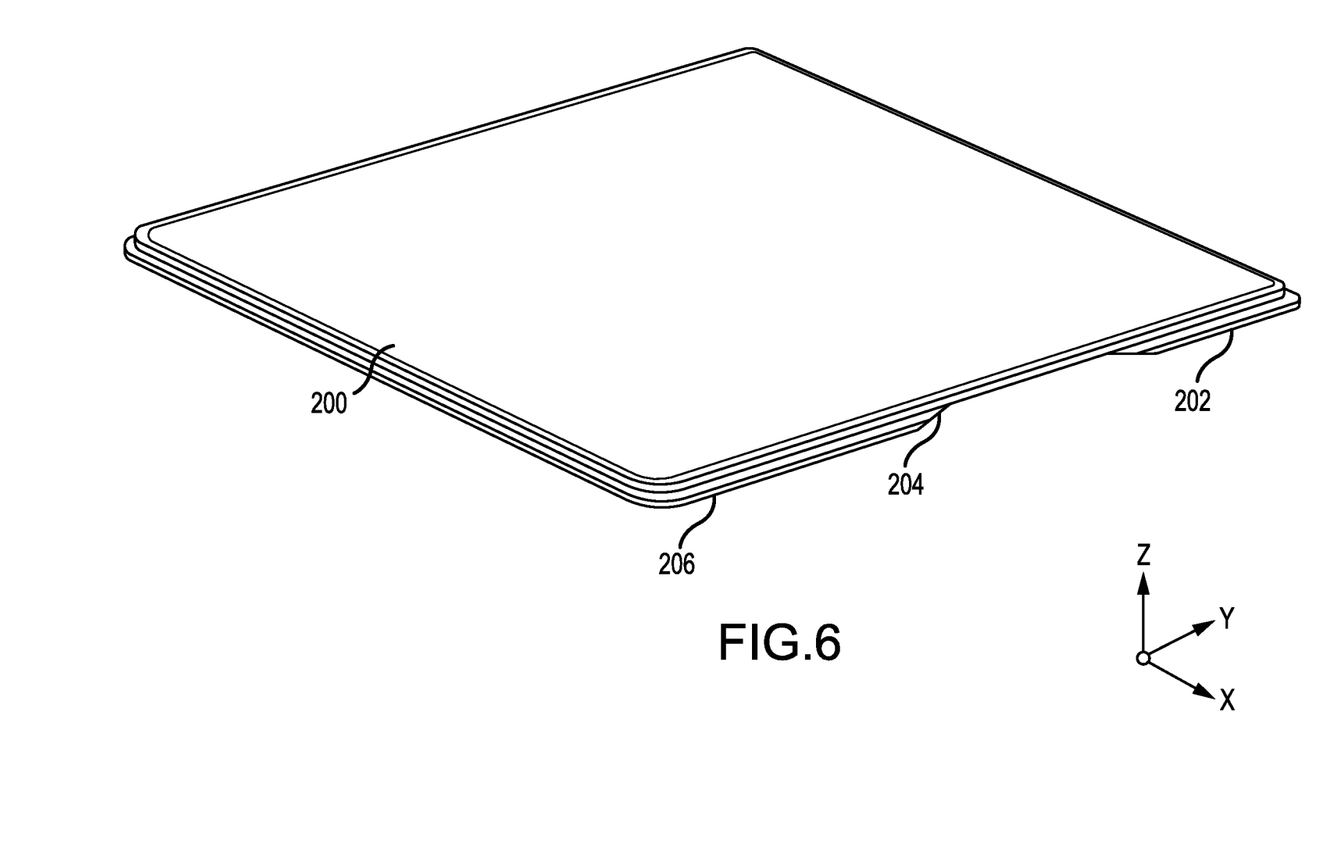
FIG. 6 illustrates a collapsible backrest in a stowed configuration, in accordance with various embodiments.

Referring to FIG. 6, collapsible backrest 106 is shown in a stowed configuration, in accordance with various embodiments. In the stowed configuration, back panel 200 may define a first surface. Base panel 202, central panel 204, and end panel 206 may be folded along the flexible joint between base panel 202 and back panel 200, with base panel 202, central panel 204, and end panel 206 oriented end-to-end and substantially parallel to base panel 202.

Figure 7:
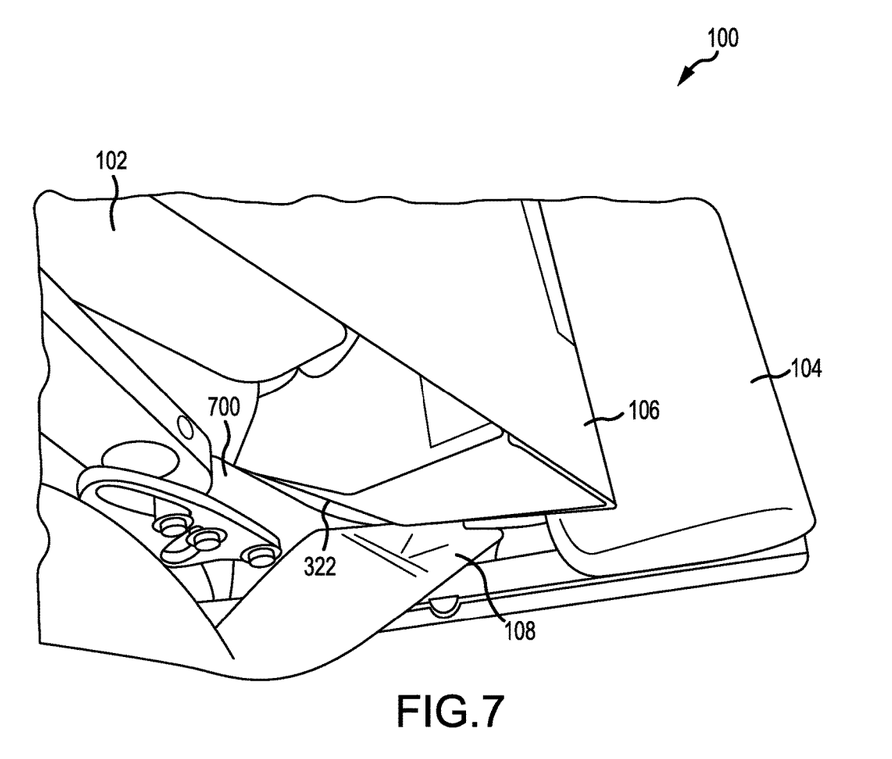
FIG. 7 illustrates a collapsible backrest deployed and engaged with a seat housing, in accordance with various embodiments.

Referring now to FIG. 7, an collapsible backrest 106 is shown in a deployed position and engaged with seat 100 according to various embodiments. Back 102 of seat 100 and base 104 of seat 100 define joint 108. Joint 108 may include a crack between base 104 and back 102. Housing 700 may define the lateral boundary of seat 100. Notch 322 of collapsible backrest 106 may engage housing 700 to retain collapsible backrest 106 laterally on seat 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A collapsible backrest, comprising:
   a cover;
   a back panel retained within a first compartment of the cover;
   a base panel flexibly coupled to the back panel and retained within a second compartment of the cover;
   a central panel flexibly coupled to the base panel and retained within a third compartment of the cover; and
   an end panel flexibly coupled to the central panel and retained within a fourth compartment of the cover, wherein the base panel, the central panel, and the end panel form a triangular support structure in a deployed position.

2. The collapsible backrest of claim 1, wherein the back panel, the base panel, the central panel, and the end panel are contiguous.

3. The collapsible backrest of claim 1, wherein the cover comprises at least one of a textile or animal hide stitched to define the first compartment, the second compartment, the third compartment, and the fourth compartment.

4. The collapsible backrest of claim 1, wherein the first compartment, the second compartment, the third compartment, and the fourth compartment are stitched together.

5. The collapsible backrest of claim 1, wherein the central panel and the base panel define a notch.

6. The collapsible backrest of claim 1, wherein the central panel and the end panel define a cavity.

7. The collapsible backrest of claim 1, wherein the back panel comprises carbon fiber.

8. The collapsible backrest of claim 1, wherein the base panel comprises polycarbonate.

9. The collapsible backrest of claim 1, wherein the base panel defines cutouts.

10. A collapsible backrest, comprising:
a cover;
a back panel retained within a first compartment of the cover;
a base panel flexibly coupled to the back panel and retained within a second compartment of the cover;
a central panel flexibly coupled to the base panel and retained within a third compartment of the cover,
wherein the central panel and the base panel define a notch; and
an end panel flexibly coupled to the central panel and retained within a fourth compartment of the cover,
wherein the central panel and the end panel define a cavity,
wherein the base panel, the central panel, and the end panel form a triangular support structure in a deployed position, and
wherein the base panel, the central panel, and the end panel are arranged end-to-end and substantially parallel to the back panel in a stowed position.

* * * * *